Patented Jan. 17, 1928.

1,656,694

UNITED STATES PATENT OFFICE.

CHARLES DANIER, OF PARIS, FRANCE, ASSIGNOR TO SYNDICAT FRANCO-NEERLANDAIS, OF PARIS, FRANCE.

PROCESS FOR THE RENEWING OF INDIA RUBBER AND CHIEFLY OF THAT WHICH IS CONTAINED IN THE COVERS OF WORN-OUT PNEUMATIC TIRES.

No Drawing. Application filed September 16, 1926, Serial No. 136,002, and in France April 8, 1926.

This invention relates to processes of renewing or regenerating rubber and it comprises a process in which waste rubber, such as that contained in worn out tires is impregnated with rubber distillate and the impregnated mass thereafter subjected to the action of a mineral acid such as hydrochloric acid to polymerize the distillate and to destroy cellulosic materials such as threads and cords in the impregnated waste rubber.

It has been suggested to make use of the distillation products of rubber in the regeneration of rubber. In one process in particular, waste rubber in the form of clippings for instance is impregnated with either a rubber distillate as such or a polymerized rubber distillate, the purpose of impregnating being essentially to bind the clippings together.

Rubber distillate, the term commonly employed to designate the products resulting from distilling rubber, contains mostly isoprene, an unsaturated hydrocarbon, boiling at about 35° C. together with a much less volatile hydrocarbon denominated heveene. Isoprene, when treated with hydrochloric acid for instance, polymerizes to a rubbery substance which is ordinarily known as "synthetic" rubber.

In my process, I make use of the polymerization of isoprene in such a way that the isoprene is polymerized within the impregnated tire scrap or other form of waste rubber. This gives me a more homogeneous product and a material more suitable for use than hitherto proposed.

In carrying out my invention, I first distill waste rubber, advantageously rubber unsuitable for renewal purposes, such as the beads of tires, old gas or water pipes and the like. I then impregnate strips of tires with the rubber distillate which is unpolymerized. I saturate the strips with the rubber distillate until the strips have taken up all the distillate which they will absorb. After the strips are thoroughly impregnated with the unpolymerized distillate, I then immerse the impregnated strips in a mineral acid such as hydrochloric which will polymerize the isoprene in the distillate. The concentration of the acid is of small consequence. It can be concentrated or diluted. The acid acts to polymerize the isoprene thus forming synthetic rubber within the strips and furthermore acts to destroy the textile fabric which may be in the strips treated. The hydrochloric acid, when cold, has no effect on the rubber itself.

It requires from fifteen to twenty days to completely polymerize the distillate and thereafter the mass, which is slightly viscous, is thoroughly washed with water to remove the excess of acid and is then transferred to a washing drum to remove the waste textile material which has been decomposed by the acid.

The final product can be satisfactorily employed for all purposes to which rubber is put with the exception of forming rubber solutions.

What I claim is—

1. The process of regenerating rubber which comprises impregnating waste rubber with an unpolymerized rubber distillate and thereafter treating the impregnated mass with a mineral acid to polymerize the distillate.

2. The process of regenerating waste rubber which comprises impregnating waste rubber with an unpolymerized rubber distillate and thereafter treating the impregnated mass with hydrochloric acid to polymerize the distillate.

3. As a new material, waste rubber containing polymerized rubber distillate, said distillate being polymerized within the waste rubber subsequent to impregnation of the rubber with unpolymerized distillate.

In testimony whereof I affix my signature.

CHARLES DANIER.